(12) United States Patent
Rijhsinghani et al.

(10) Patent No.: US 10,025,622 B2
(45) Date of Patent: Jul. 17, 2018

(54) DISTRIBUTED ORDER ORCHESTRATION

(75) Inventors: Sumeet Rijhsinghani, Fremont, CA (US); Rajeev Bellamkonda, Foster City, CA (US); Fred Mahakian, Erie, CO (US); Lynn Leah Reed, Newburyport, MA (US); Alok Singh, Fremont, CA (US); Samuel Wong, Happy Valley (HK)

(73) Assignee: Oracle International Corporation, Redwood Shores, CA (US)

( * ) Notice: Subject to any disclaimer, the term of this patent is extended or adjusted under 35 U.S.C. 154(b) by 912 days.

(21) Appl. No.: 12/617,698

(22) Filed: Nov. 12, 2009

(65) Prior Publication Data

US 2011/0112885 A1    May 12, 2011

(51) Int. Cl.
*G06F 9/48* (2006.01)
*G06Q 10/06* (2012.01)
*G06Q 30/06* (2012.01)

(52) U.S. Cl.
CPC ..... *G06F 9/4843* (2013.01); *G06Q 10/06315* (2013.01); *G06Q 10/0633* (2013.01); *G06Q 10/06316* (2013.01); *G06Q 30/0633* (2013.01); *G06Q 30/0635* (2013.01)

(58) Field of Classification Search
CPC .. G06Q 10/00; G06Q 30/00; G06Q 10/06315; G06Q 10/0633; G06Q 10/06316; G06Q 30/0633; G06Q 30/0635
USPC .................. 705/7.25, 7.26, 7.27, 26.8, 26.81
See application file for complete search history.

(56) References Cited

U.S. PATENT DOCUMENTS

| | | | | |
|---|---|---|---|---|
| 6,182,246 B1 * | 1/2001 | Gregory | ................ | G06F 11/263 714/38.14 |
| 6,862,573 B2 * | 3/2005 | Kendall et al. | ............. | 705/7.11 |
| 6,876,977 B1 * | 4/2005 | Marks | ........................ | 705/26.62 |
| 7,177,825 B1 * | 2/2007 | Borders et al. | ............ | 705/26.81 |
| 7,469,219 B2 * | 12/2008 | Goldberg | ..................... | 705/7.13 |

(Continued)

OTHER PUBLICATIONS

Supporting optimization of business-to-business e-commerce relationships, William Kuechler Jr., Vijay K. Vaishnavi, David Kuechler, Department of Accounting and Computer Information Systems, University of Nevada, Department of Computer Information Systems, Georgia State University, (Year: 2001).*

(Continued)

*Primary Examiner* — Timothy Padot
*Assistant Examiner* — Darlene Garcia-Guerra
(74) *Attorney, Agent, or Firm* — Trellis IP Law Group, PC

(57) ABSTRACT

A distributed order orchestration is provided. The system comprises a decomposition layer configured to receive an order and determine one or more orchestration services for fulfilling the order. An orchestration layer is configured to receive the one or more orchestration services for the order and orchestration performing of the one or more orchestration services. A task layer is configured to control performing of one or more tasks for the one or more orchestration services being performed. Also, an external interface layer configured to translate and route the one or more tasks to one or more external systems for processing. The external task layer is configured to receive one or more results for performance of the one or more tasks by the one or more external systems where the one or more results used to orchestrate fulfilling the order.

14 Claims, 3 Drawing Sheets

(56) References Cited

U.S. PATENT DOCUMENTS

| | | | |
|---|---|---|---|
| 8,190,465 B2* | 5/2012 | Lokowandt | G06Q 10/0631 700/100 |
| 2002/0013731 A1* | 1/2002 | Bright et al. | 705/22 |
| 2002/0091533 A1* | 7/2002 | Ims et al. | 705/1 |
| 2002/0107913 A1* | 8/2002 | Rivera et al. | 709/203 |
| 2002/0152133 A1* | 10/2002 | King et al. | 705/26 |
| 2003/0036917 A1* | 2/2003 | Hite et al. | 705/1 |
| 2003/0204448 A1* | 10/2003 | Vishik et al. | 705/27 |
| 2003/0216950 A1* | 11/2003 | Chen | 705/8 |
| 2004/0103367 A1* | 5/2004 | Riss et al. | 715/506 |
| 2004/0117358 A1* | 6/2004 | von Kaenel | G06F 17/30241 |
| 2005/0015288 A1* | 1/2005 | Reeves et al. | 705/8 |
| 2005/0021425 A1* | 1/2005 | Casey | 705/28 |
| 2005/0096967 A1* | 5/2005 | Gerrits et al. | 705/10 |
| 2006/0165105 A1* | 7/2006 | Shenfield et al. | 370/401 |
| 2007/0033098 A1* | 2/2007 | Peters | G06Q 30/02 705/14.25 |
| 2007/0038524 A1* | 2/2007 | Fiechter et al. | 705/26 |
| 2007/0055607 A1* | 3/2007 | Wunsch et al. | 705/37 |
| 2007/0106617 A1* | 5/2007 | Mabray et al. | 705/59 |
| 2007/0121850 A1* | 5/2007 | Klos et al. | 379/114.28 |
| 2007/0203799 A1* | 8/2007 | Caballero | G06Q 30/06 705/26.4 |
| 2007/0282616 A1* | 12/2007 | Brunswig et al. | 705/1 |
| 2008/0049920 A1* | 2/2008 | Napoleoni et al. | 379/201.12 |
| 2008/0052138 A1* | 2/2008 | Marsh et al. | 705/7 |
| 2008/0059773 A1* | 3/2008 | Fant | G06F 9/4425 712/220 |
| 2008/0096594 A1* | 4/2008 | Vinding | 455/466 |
| 2008/0154657 A1* | 6/2008 | Nayak | 705/7 |
| 2008/0172237 A1* | 7/2008 | Lai et al. | 705/1 |
| 2009/0037289 A1* | 2/2009 | Chvala et al. | 705/26 |
| 2009/0067601 A1* | 3/2009 | Gilles et al. | 379/201.12 |
| 2009/0094364 A1* | 4/2009 | Stevens | G06F 9/5072 709/226 |
| 2009/0112675 A1* | 4/2009 | Servais | 705/8 |
| 2009/0112775 A1* | 4/2009 | Chiulli et al. | 705/36 R |
| 2009/0157457 A1* | 6/2009 | Huuhtanen et al. | 705/7 |
| 2009/0171720 A1* | 7/2009 | Crook | G06Q 10/04 705/35 |
| 2010/0057669 A1* | 3/2010 | Gandini et al. | 707/1 |
| 2010/0161366 A1* | 6/2010 | Clemens et al. | 705/8 |
| 2010/0262451 A1* | 10/2010 | Bahrami | G06Q 10/0633 705/7.27 |

OTHER PUBLICATIONS

Multi-agent cooperation, dynamic workflow and XML for e-commerce automation, Qiming Chen, Meichun Hsu, Umeshwar Dayal, Martin L. Griss (Year: 2000).*

Oracle Application Integration Architecture for Communications 2.0: Release Note; Nov. 2007; 37 pages.

WS-BPEL Extension for Sub-processes—BPEL-SPE; A Joint White Paper by IBM and SAP; Sep. 2005; 17 pages.

* cited by examiner

DISTRIBUTED ORDER ORCHESTRATION

CROSS-REFERENCE TO RELATED APPLICATIONS

This application is related to the following: U.S. patent application Ser. No. 12/617,695, entitled "DATA DRIVEN ORCHESTRATION OF BUSINESS PROCESSES" (ORACP0002), U.S. patent application Ser. No. 12/617,696, entitled "REUSABLE BUSINESS SUB-PROCESSES AND RUN-TIME ASSEMBLY" (ORACP0005), and U.S. patent application Ser. No. 12/617,697, entitled "VERSIONING AND EFFECTIVITY DATES FOR ORCHESTRATION BUSINESS PROCESS DESIGN" (ORACP0006), each of which is hereby incorporated by reference as if set forth in full in this document for all purposes.

BACKGROUND

Particular embodiments generally relate to computer systems and, in particular, to distributed order orchestration.

Order management systems are computer software and/or hardware systems implemented by a number of industries to facilitate order entry and processing. Companies, such as catalog companies and those utilizing electronic commerce, use order management systems to receive, process and fulfill customer orders. An order management system makes possible the entering of an order via a web-site shopping cart or data entry system. The system typically captures customer proprietary information and/or account level information for each order. Credit verification or payment processing may then be performed to check for available funds and validate the transaction. Valid orders are processed for warehouse fulfillment, including picking, packing and shipping of the ordered goods or services.

SUMMARY

A distributed order orchestration is provided. The system comprises a decomposition layer configured to receive an order and determine one or more orchestration services for fulfilling the order. An orchestration layer is configured to receive the one or more orchestration services for the order and orchestration performing of the one or more orchestration services. A task layer is configured to control performing of one or more tasks for the one or more orchestration services being performed. Also, an external interface layer configured to translate and route the one or more tasks to one or more external systems for processing. The external task layer is configured to receive one or more results for performance of the one or more tasks by the one or more external systems where the one or more results used to orchestrate fulfilling the order. In one embodiment, two categories of user interfaces are designed to manage the distributed order orchestration process through its lifecycle. One user interface gives users visibility into the current running order orchestration activities as well as the ability to interact/change those activities. The other category covers the full set of administrative user interfaces designed to give the user flexibility in defining exactly what the order orchestration activities are and how they work.

In one embodiment, a system is provided comprising: a decomposition layer configured to receive an order and determine one or more orchestration services for fulfilling the order; an orchestration layer configured to receive the one or more orchestration processes for the order and orchestration performing of the one or more orchestration processes; a task layer configured to control performing of one or more tasks for the one or more orchestration processes being performed; and an external interface layer configured to translate and route the one or more tasks to one or more external systems for processing, wherein the external task layer is configured to receive one or more results for performance of the one or more tasks by the one or more external systems, the one or more results used to orchestrate fulfilling the order.

In another embodiment, a method is provided comprising: receiving an order and determine one or more orchestration services for fulfilling the order; receiving the one or more orchestration processes for the order and orchestration performing of the one or more orchestration processes; performing of one or more tasks for the one or more orchestration processes being performed; and translating and routing the one or more tasks to one or more external systems for processing, wherein the external task layer is configured to receive one or more results for performance of the one or more tasks by the one or more external systems, the one or more results used to orchestrate fulfilling the order.

In yet another embodiment, an apparatus is provided comprising: means for receiving an order and determine one or more orchestration services for fulfilling the order; means for receiving the one or more orchestration processes for the order and orchestration performing of the one or more orchestration processes; means for performing of one or more tasks for the one or more orchestration processes being performed; and means for translating and routing the one or more tasks to one or more external systems for processing, wherein the external task layer is configured to receive one or more results for performance of the one or more tasks by the one or more external systems, the one or more results used to orchestrate fulfilling the order A further understanding of the nature and the advantages of particular embodiments disclosed herein may be realized by reference of the remaining portions of the specification and the attached drawings.

DETAILED DESCRIPTION OF EMBODIMENTS

Figure 1:
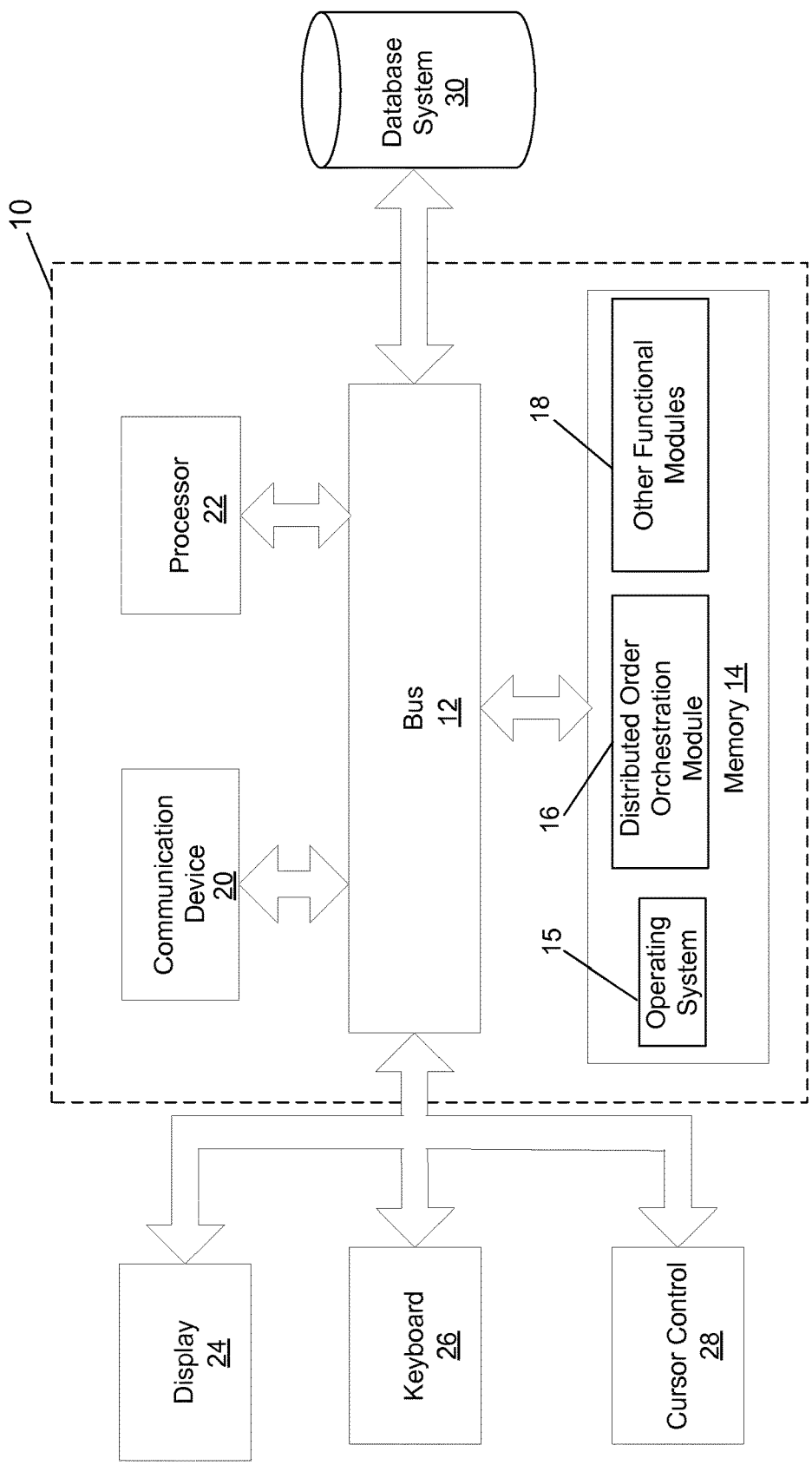
FIG. 1 illustrates a block diagram of a system that may implement one embodiment of the invention.

Companies and enterprises seek to differentiate themselves in leveraging the order-to-cash process by providing certain capabilities through a single, integrated order management system. These capabilities include presenting a single face to the customer through an order lifecycle, providing a single and complete view of the resources needed to fulfill a good and/or services order, and the ability to manage intra and inter-enterprise order orchestration processes for fulfillment execution. To date, enterprises have generally been unable to achieve these goals because of their current environments and because of the lack of a complete solution in the market.

Typically, enterprises have used single instance enterprise resource planning (ERP), custom solutions, or packaged applications to try and meet their goals given the order management environment. Single instance ERP is a common approach among companies that own large ERP systems. It entails systematic replacement of order management systems onto a single platform. Issues with this approach, however, include long timeframes to replace legacy systems coupled with custom code in an appointed order management system to integrate during the replacement period. In addition, corporate acquisitions often extend the replacement period indefinitely. Custom solutions use a middleware product and a large number of consultants to build custom business process flows and integrations. The deployments are typically expensive, complex, and difficult to maintain and alter. Packaged applications are one step above a custom solution because they use an off-the-shelf order management integration package that reduces the cost of business process development. These applications are typically not customizable and cannot meet all of enterprises' order management goals.

Particular embodiments provide an improved order management system that overcomes at least the drawbacks outlined above. One embodiment is directed to a distributed order orchestration system. Distributed order orchestration provides a flexible, configurable infrastructure that can be easily customized to be consistent with an enterprise's business practices and existing order fulfillment system architecture. In one example, the distributed order orchestration system includes a capture layer for capturing customer orders across multiple channels, a decomposition layer to help determine the orchestration process, an orchestration layer for executing and orchestrating order line processing, a task layer services for performing task related logic, an external interface layer for interfacing with external systems, a fulfillment layer, a global order promising layer to provide a user interface for scheduling and sourcing. The distributed order orchestration system may further include a fulfillment workbench layer that interfaces with the other layers of the system and manages sources, tasks and assignments. The various layers of the distributed order orchestration system described above combine to provide a complete order management solution at reduced implementation and maintenance costs.

FIG. 1 illustrates a block diagram of a system 10 that may implement one embodiment of the invention. System 10 includes a bus 12 or other communications mechanism for communicating information between components of system 10. System 10 also includes a processor 22, coupled to bus 12, for processing information and executing instructions or operations. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer readable media. System 10 further includes a communication device 20, such as a network interface card or other communications interface, to provide access to a network. As a result, a user may interface with system 10 directly or remotely through a network or any other method.

Computer readable media may be any available media that can be accessed by processor 22 and includes both volatile and nonvolatile media, removable and non-removable media, and communication media. Communication media may include computer readable instructions, data structures, program layers or other data in a modulated data signal such as a carrier wave or other transport mechanism and includes any information delivery media.

Processor 22 is further coupled via bus 12 to a display 24, such as a Liquid Crystal Display ("LCD"), for displaying information to a user, such as configuration information. A keyboard 26 and a cursor control device 28, such as a computer mouse, are further coupled to bus 12 to enable a user to interface with system 10. Processor 22 and memory 14 may also be coupled via bus 12 to a database system 30 and, thus, may be able to access and retrieve information stored in database system 30. Although only a single database is illustrated in FIG. 1, any number of databases may be used in accordance with certain embodiments.

In one embodiment, memory 14 stores software layers that provide functionality when executed by processor 22. The layers may include an operating system 15 that provides operating system functionality for system 10. The memory may also store distributed order orchestration layer 16, which provides a complete order intake and product fulfillment solution, as will be discussed in more detail below. System 10 may also include one or more other functional layers 18 to provide additional functionality.

Database system 30 may include a database server and any type of database, such as a relational or flat file database. Database system 30 may store data related to the object, the distributed order orchestration layer 16, and/or any data associated with system 10 or its associated layers and components.

In certain embodiments, processor 22, order orchestration layer 16, and other functional layers 18 may be implemented as separate physical and logical units or may be implemented in a single physical and logical unit. Furthermore, in some embodiments, processor 22, order orchestration layer 16, and other functional layers 18 may be implemented in hardware, or as any suitable combination of hardware and software.

Figure 2:
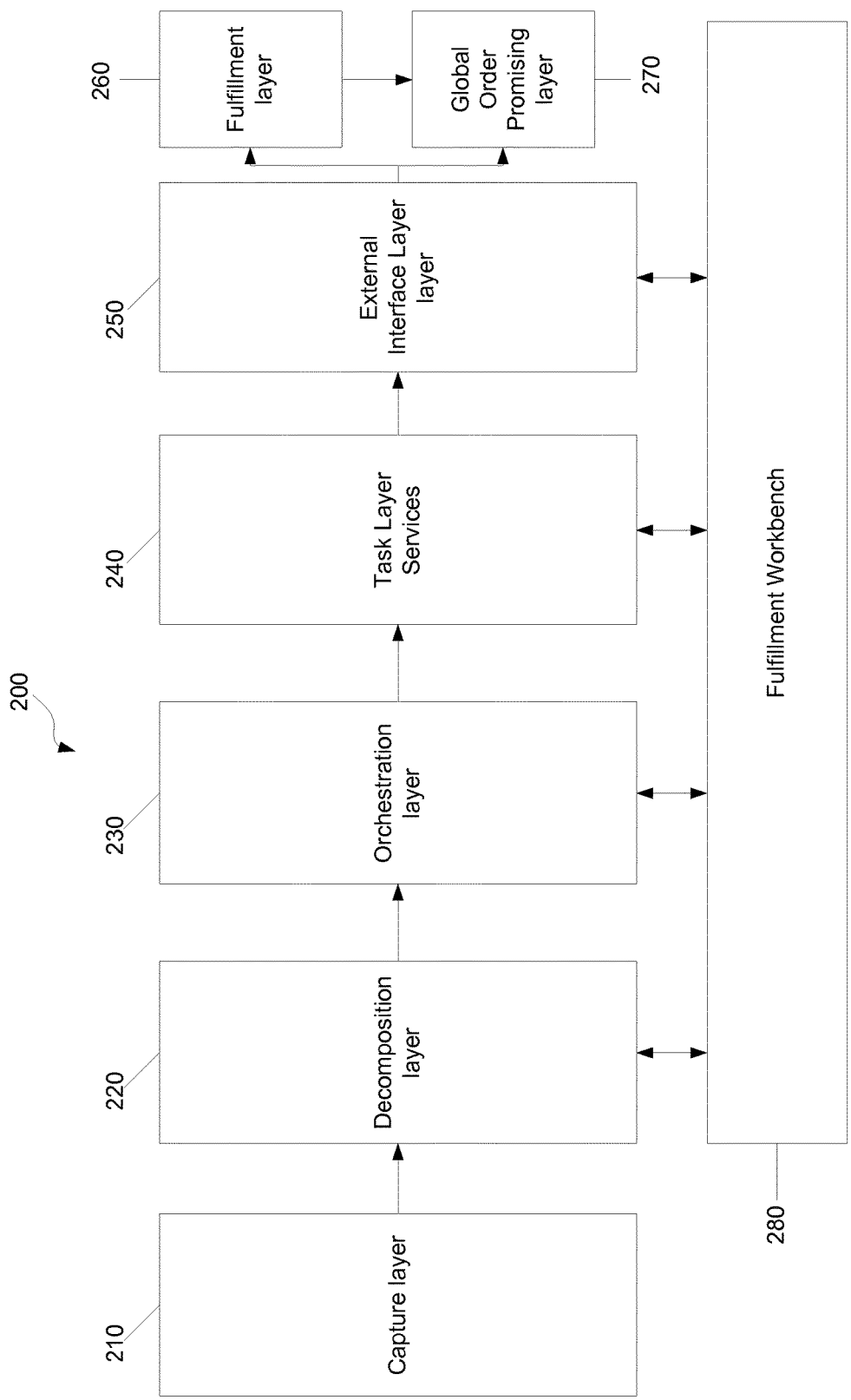
FIG. 2 illustrates an example of a distributed order orchestration system according to one embodiment.

FIG. 2 illustrates an example of a distributed order orchestration system 200 according to one embodiment. Distributed order orchestration system 200 includes a capture layer 210 that can receive and capture information related to customer orders for goods and/or services across multiple channels. The order may be received via a graphical user interface, such as that of a website shopping cart, or can be received via any data entry system. The capture layer 210 captures and forwards the order information to a decomposition layer 220.

Order Capture systems capture the order with any necessary functional attributes that are needed to process the order, such as pricing, validation, eligibility, etc. The sales order is fed to decomposition layer 220 in a Source Order object. The source order object is generated from a sales order object submitted by different capture systems. The source order object is in a generic format that is fed into the decomposition layer 220.

Decomposition layer 220 receives the order information and breaks the received order into individual purchase orders to be sent to fulfillment systems and supply-side partners for execution. Decomposition layer 220 may include a decomposition rules workbench for setting up rules, rule sets, and transformation processes for the order capture layer 210 may capture the order from a sales perspective. For example, a laptop computer may be sold worldwide. The laptop includes a power cord, but the customer just buys a laptop (one line on the order). That is, a sales website may want to just sell the laptop and not have the customer individually order the power cord separately. However, from a fulfillment perspective, the laptop and the power cord need to be retrieved for the order. In decomposition layer 220, there is a business rule that says that a laptop must have a power cord and the plug on the power cord must match the country to which the laptop is shipped. So when decomposition module 220 is complete, the order has two lines, one with the laptop and one for the appropriate power cord. Thus, the order has been decomposed into multiple items that need to be fulfilled.

Also, decomposition layer 220 may take the received order and translate it to the order format and order content required by the other layers of the distributed order orchestration system 200, such as the fulfillment layer 260. Because capture layer 210 is capable of receiving orders in any format for compatibility purposes across different types of systems, decomposition layer 220 may need to translate the order into a format that is compatible with and can be recognized by all the other layers and/or processes of the distributed order orchestration system 200. Additionally, decomposition layer 200 may provide a process launch capability to assign and launch orchestration processes for an order based on appropriate decomposition rules. For example, different orchestration processes are assigned based on parameters in the order. For example, a company may give special treatment to certain customers in terms of speed of fulfillment or shipping. For example, Gold customers may be offered expedited shipping. And there may be an additional step for communication with the customer. When the orders for these customers are received, they are assigned to the orchestration process that has these parameters and steps while orders for other customers may be assigned to standard processes.

Decomposition may use a canonical object model to accomplish the decoupling of data format from order capture systems. Decomposition integration processes work on a set of generic data structures called Sales Order Enterprise Business Objects (EBO's). They are based on the canonical data model. This approach allows the DOO to be agnostic of participating applications and be independent of source or target applications. The model eliminates the need to map data from different applications directly to each other.

Distributed order orchestration system 200, as illustrated in FIG. 2, further includes an orchestration layer 230. Orchestration layer 230 provides individual orchestration processes to manage order and/or service line items. For example, orchestration layer 230 may provide business process management functionality to support planning of steps within a process, including step duration and calculation or re-calculation of completion dates. Orchestration layer 230 may also provide external task execution functionality to support creation, update, release, and monitoring of external tasks. External tasks are those that are carried out by the fulfillment systems. Task layer services do specific processing and then send the data to these integrated fulfillment systems. Orchestration is a sequence of task layer service invocations.

Orchestration layer 230 may also provide for jeopardy management in order to check a promised delivery date of an order against current estimated date for completion, map to user defined thresholds, and handle or escalate conditions. Orchestration layer may further provide a process for change orders, including a support process rollback to accommodate for change order automation and modify in-flight orchestration processes for orders changed in order capture stage. Further, a projected order completion date may be provided by instantiating the orchestration process. Orchestration layer 230 also provides a mechanism for updating an order status automatically or upon user request.

Particular embodiments provide an orchestration tool that provides a high degree of abstraction for business process modeling in an order fulfillment business process. Business processes may be modeled by users, such as business analysts, and do not need any coding from an IT designer to have the business process executed. Users are provided the flexibility to define business processes in a user interface, such as a web-based administration user interface. The business process may identify one or more services that define steps to be performed in the order fulfillment process. A run-time engine then uses the definition to dynamically invoke the services based on the definition of the business proc process.

In the business environment, business users are often process modelers, not IT personnel. By providing a web-based administration environment, the business users may be able to design the business process. The process definitions may be defined in business terms and not in IT terms. Particular embodiments allow an administrative environment outside of a code editor, such as a BPEL editor, for defining processes using associated services. Users can configure processes that can be executed at runtime as executable processes without IT involvement. This alleviates the need for deploying the processes every time a modification of the business process is needed. The user sets up the sequence of services on a data table. The modeled business process is then used to perform an executable process, which is assembled and executed at run-time. In one embodiment, 'run-time' can be defined as the time when an order is received for processing. Metadata is assembled in data run-time tables and used to define the executable process for the business process. The metadata is used to invoke services in the executable process.

In one example, the services invoked are encapsulated and reusable. The metadata is used to determine how and when to invoke services. Also, depending on the metadata, input arguments are generated and sent to the services to invoke the encapsulated service. A common signature is used to send data to invoke the services. The common signature defines a data structure that allows the services to be re-used for different executable processes. Different input arguments can be formulated for different services used in different executable processes. The input arguments are formatted in the same way such that a service can read the different sets of data and invoke the service. Thus, services can be re-used in different business processes without the need to be re-coded and redeployed. Deployment of services indicates the process is ready to be released for testing or production.

Further details on orchestration are described in the U.S. patent applications referenced at the beginning of this specification.

Distributed order orchestration system 200 may further include a task layer services 240 to provide encapsulated services used to control processing logic for each orchestration process stage. In particular, task layer services 240 may provide task-specific business logic to wrap logic around a certain request such that the system 200 knows what logical tasks are associated with a particular request. The steps that need to be performed in the executable process from orchestration may require tasks to be performed. For example, task layer services 240 can provide and control processing logic for scheduling a shipment, requesting a shipment, updating install base, creating an activity, etc. The output of task layer services 240 is a standard goods and/or service request(s) which may be provided to other layers of the system 200, such as external interface layer 250 or fulfillment layer 260. In addition, task layer services 240 may receive input that can be used to update the processing logic or status.

Task layer services 240 initiates the task, generates a message for an external system, and sends the message. The data structure that is needed to have the task performed is generated. Certain tasks may be predefined in task layer services. Also, a customer may add other tasks using a template that defines how to create a task. The message generated indicates which task should be performed by the external system. The task to be performed is an aspect of order processing that has been modeled. For example, the task may be invoicing for an order. Parameters for performing the task are also included. The message is sent to an external interface of external interface layer 250. Task layer services 240 transforms and sends the message to the external system layer.

Distributed order orchestration system 200 also includes an external interface layer 250 to translate standard request(s) and route the request(s) to external systems for processing. More specifically, external interface layer 250 may receive the standard goods and/or services request(s) output by the task layer services 240 and provide a single layer transform of the request(s) if needed to match the format of fulfillment systems. The transformation performed by external interface layer maps the data to the content and format required by the integrated fulfillment systems. Transformation by decomposition layer 220 converts the data to the internal format used by system 200. External interface layer 250 may map the data structure from task layer services 240 to the external format. External interface layer 250 provides flexible routing so that request(s) are routed to specific fulfillment systems based on business rules. For example, if more than one shipping system is available for fulfillment, business rules will determine to which shipping system an individual shipping request will be sent. External interface layer 250 may also include a transformation rules workbench that can be utilized to setup rules, rule sets, and transformation data for external routing of request(s).

The messages generated by the task layer may be in a generic format. Different external systems, however, may communicate using other formats. The external interface layer determines the format used by an external system and transforms the message. For example, metadata defined by a user may be used to determine the format to be used. In one example, mappings to what external systems call a product that was ordered are used to translate the message.

The external systems may be systems that perform the task related to processing an order, such as a scheduling system, shipping system, etc. When the task is performed, the result of the task is determined. The result may be a date when a shipment is scheduled, a date when a good is shipped, etc. The result is then sent back to external interface layer 250.

Distributed order orchestration system 200 may further include a global order promising layer 270 that provides an interface, such as a graphical user interface, for scheduling and sourcing orders. In particular, in one embodiment, global order promising layer 270 includes a sourcing broker that determines the best source for products and services associated with the order based upon a customer profile, order and supplier definitions, etc. Also, global order promising layer 270 provides for real-time reserve and un-reserve of inventory and inventory check across distributed internal systems. The interface of global order promising layer 270 allows for the viewing of availability and sourcing information so that a user can view the availability of and manually change the source from which an order for a good or service is being fulfilled.

A fulfillment workbench 280 may also be provided as a user interface for order fulfillment administrators, users and supervisors to monitor and manage the flow of orders through the system 200. In an embodiment, fulfillment workbench 280 provides users, such as supervisors, with a mechanism to monitor order fulfillment tasks, including allowing supervisors to monitor activity load and to produce reports. Fulfillment workbench 280 further provides a fulfillment process analysis that allows business process designers to analyze process metrics such as the number of manual interventions, the number and type of errors that occurred, the number of late orders, and the expected process duration versus the actual duration. In certain embodiments, a fulfillment system performance analysis capability is also included within the fulfillment workbench 280 to provide reports and dashboards to enable order managers to view orders for each system and analyze performance. The fulfillment workbench may make use of graphical representations (e.g. graphs and charts) to clearly convey system status/order information to users. Because DOO system 200 has the data reference data, it is possible to draw aggregated graphs/charts for trending analysis. Users may take actions from the fulfillment workbench as described below, such as by substituting the item ordered, splitting the quantity into multiple order lines, putting a hold on the orderlines to prevent further progression, etc.

According to one embodiment, fulfillment workbench 280 allows users to make mass order information changes related to fulfillment including making single line or mass line changes to fulfillment information (e.g., dates, etc.). Fulfillment workbench 280 may further allow for the monitoring of orchestration processes, such as reviewing the status of orchestration processes including overall process progress, as well as status of individual tasks and corresponding fulfillment lines and people lines. Fulfillment workbench 280, in one embodiment, includes mechanisms for maintaining order fulfillment processing and allows an order processing user to control a process associated with an order including pause, edit, cancel, etc.

In some embodiments, fulfillment workbench 280 also provides functionality for order and task assignment. For example, fulfillment workbench 280 may use an assignment engine to assign orders and activities to the appropriate fulfillment resource. Fulfillment workbench 280 may include a mechanism for batch re-assignment of orders thereby allowing a supervisor to re-source a set of orders from one fulfillment system to another. Fulfillment workbench 280 also provides for the assignment of fill rate and backorder rules that can automatically determine how to handle shortage situations. A universal in-box may be included within fulfillment workbench 280 in order to allow users to view activities assigned to them and respond to the task.

Fulfillment workbench 280 allows a user to view orders being processed in different layers of system 200. A view of the status of an order may be generated from whichever layers have processed the order. This is because an end to end integrated system has been provided. Conventional order systems may have been customized solutions that did not allow for a view of different layers. By integrating layers in a format that allows generic communication, a user interface that can generate views from all the layers can be provided.

Examples of distributed order orchestration system 200 may also include a fulfillment layer 260. In one embodiment, fulfillment layer 260 may be an interface to external fulfillment systems, and can be used to communicate order information and fulfillment requirements to a supplier or source of the goods and/or services associated with an order.

Certain embodiments of distributed order orchestration system 200 include an administration user interface. The administration user interface provides administration services that hide the complexity of the fulfillment execution environment from the end user. For instance, the administration user interface provide product mapping via an administration environment that defines transformations to map product structure between a sales view and a supplier system definition. In this embodiment, sales view refers to a simplified view provided to consumers when making a purchase order. Supplier system definition refers to the more specific and detailed information used by suppliers of goods and/or services. The administration user interface may also provide an orchestration process workbench to set up processes, rule sets, and parameters for order orchestration. The administration user interface has an integrated setup that includes process sequence, planning, jeopardy, change management, and workbench display. The administration user interface also allows for user-defined status transitions for tasks, processes, and fulfillment lines, and business rules configuration for configuring constraints, transformation rules, and routing rules.

Figure 3:
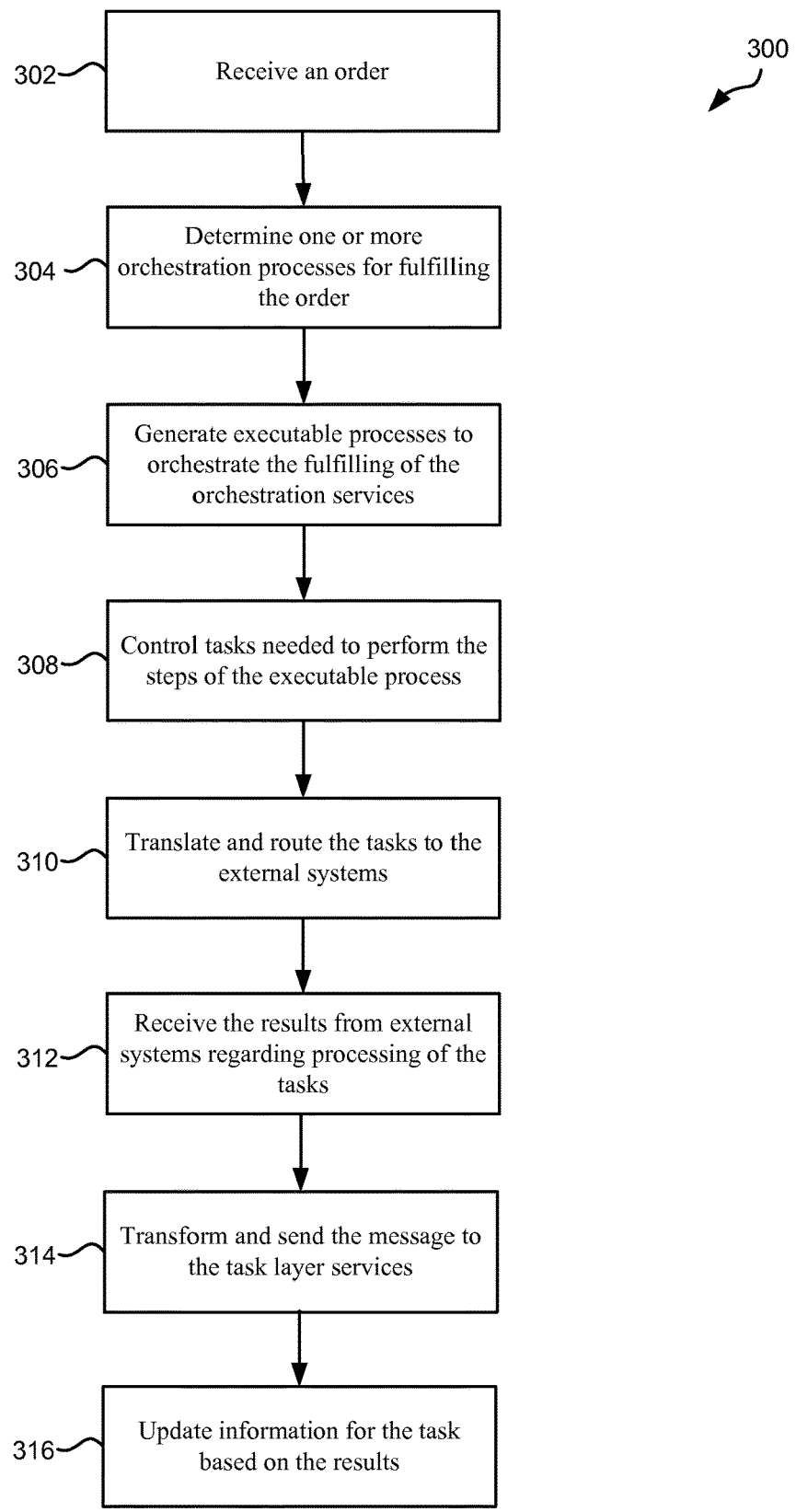
FIG. 3 depicts a simplified flowchart for processing an order according to one embodiment.

FIG. 3 depicts a simplified flowchart 300 for processing an order according to one embodiment. In step 302, decomposition layer 220 receives an order. In step 304, decomposition layer 220 determines one or more orchestration processes for fulfilling the order. For example, the order may be decomposed into items that need to be procured or services that need to be performed. Each item or service may have its own orchestration service.

In step 306, orchestration layer 230 generates executable processes to orchestrate the fulfilling of the orchestration services. The executable processes may have multiple steps that need to be performed for each orchestration service.

In step 308, task layer services 240 controls business functions needed to perform the steps of the executable process. Tasks to be performed for the executable process may include setting up a data structure with information and parameters that are needed to have external systems perform the tasks. The data structure may be in an internal format for system 200. For example, the task may be invoicing for an order. Parameters for performing the task are also included.

In step 310, external interface layer translates and routes the tasks to the external systems. Different external systems, however, may communicate using other formats. The external interface layer determines the format used by an external system and transforms the message. For example, metadata defined by a user may be used to determine the format to be used. In one example, mappings to what external systems call a product that was ordered are used to translate the message.

In step 312, external interface layer 250 receives the results from external systems regarding processing of the tasks. When the task is performed, the result of the task is determined. The result may be a date when a shipment is scheduled, a date when a good is shipped, etc.

In step 314, external interface layer 250 transforms and sends the message to the task layer services 240. In step 316, orchestration layer updates information for the task based on the results. For example, the results may be stored in a table or database. The process then continues to the next service that can be invoked.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A computer system comprising:
one or more processors;
a non-transitory memory in data communication with said processor, said memory storing distributed order orchestration software functional layers comprising computer readable instructions which when executed by said processor perform the steps of:
receiving process definitions, process configuration information and metadata from a web-based administration environment, with processes defined in business terms and configured to be executed at runtime as executable processes, with process configuration information including a sequence of services on a data table and where defined processes are executable and reusable;

utilizing a task functional layer configured to receive, analyze, and provide encapsulated services used to control processing logic for orchestration software functional layers by wrapping specific business logic around a selected request to associate specific logical tasks with the selected request;

utilizing a decomposition functional layer configured to capture a sales order, analyze parameters of the sales order to determine which orchestration process to apply to the sales order with respect to a customer associated with the sales order and use transformation processes to transform the captured sales order, in a form of a source data object, received from one of a plurality of order capture systems, with the plurality of order capture systems generating source data objects having different data formats, to a generic source order object being a generic data structure, based on a canonical data model, for internal processing by distributed order orchestration software thereby making the distributed order orchestration software agnostic to the different data formats of the source data objects and converting, in accordance with business rules, the functional attributes of one or more products included in the generic source order object into a plurality of purchase orders, where the business rules are applied to generate a first purchase order for a product and a second purchase order to a supply-side partner for a second product, specified by the business rules, necessary for fulfillment of captured sales order, each of which is in a purchase order format;

utilizing an orchestration layer to provide external task functionality to support creation, update, release and monitoring of external tasks carried out by fulfillment systems;

utilizing a task functional layer to generate and send an internally formatted goods and/or services message including specific business logic wrapped around a selected request to associate specific logical tasks with the selected request and metadata; and utilizing an external interface functional layer configured to receive, analyze, and translate a first request included in a first internally formatted goods and/or services message received from the task functional layer into a first external message having a first external format utilized by a first external fulfillment system of a plurality of external fulfillment systems to provide flexible routing to route the first request to the first external fulfillment system, where metadata is used to route the first external message and to determine the first external format, wherein the first external format includes one or more common signatures used to invoke one or more services provide by the external fulfillment system, wherein the one or more common signatures define a data structure for reuse of the one or more services in a plurality of different business processes, and wherein the one or more services include configurable services and non-configurable services which include different input arguments formulated for different services used in different executable processes, wherein the input arguments are formatted such that a service can read different sets of data and invoke the one or more services.

2. The computer of claim 1 further comprising:
utilizing the external interface functional layer to translate a second request included in a second internally formatted goods and/or services message received from the task functional layer into an second external message having a second external format utilized by a second external fulfillment system of the plurality of external fulfillment systems to provide flexible routing to route the second request to the second external fulfillment system, where metadata is used to route the second external message and to determine the second external format.

3. The computer system of claim 2 wherein utilizing the external interface functional layer to translate further includes translating an internally formatted message messages using metadata associated with a purchase order.

4. The computer system of claim 1 further comprising a display in data communication with said processor and with said distributed order orchestration software further including computer readable instructions which when executed by said processor perform an additional step of rendering upon said display an interface configured to provide a visually perceivable representation of activities undertaken to fulfill said source data object.

5. The computer system of claim 4 wherein rendering further includes providing a visually perceivable representation of a sequence of tasks.

6. The computer system of claim 1 further comprising: computer readable instructions which when executed by said one or more processors perform an additional step of receiving from said first fulfillment system a message indicating performance of one of a sequence of tasks.

7. The computer system of claim 1 further comprising: computer readable instructions which when executed by said processor perform an additional step of receiving, from said first external fulfillment system, a message in the first external message format indicating performance of one of a sequence of tasks and translating said message into a generic data structure.

8. The computer system of claim 1 further comprising: computer readable instructions which when executed by said processor perform an additional step of receiving, from said first fulfillment system, messages in a plurality of external message formats having the one or more common signatures, a subset of which indicate performance of one of a sequence of tasks, and translating said plurality of message formats into a common data structure.

9. A computer method comprising:
receiving, by the computer, process definitions, process configuration information and metadata from a web-based administration environment, with processes defined in business terms and configured to be executed at runtime as executable processes, with process configuration information including a sequence of services on a data table and where defined processes are executable and reusable;

utilizing, by the computer, a task functional layer configured to receive, analyze, and provide encapsulated services used to control processing logic for orchestration software functional layers by wrapping specific business logic around a selected request to associate specific logical tasks with the selected request;

utilizing, by the computer, a decomposition functional layer configured to capture a sales order, analyze parameters of the sales order to determine which orchestration process to apply to the sales order with respect to a customer associated with the sales order and use transformation processes to transform the captured sales order, in a form of a source data object, received from one of a plurality of order capture systems, with the plurality of order capture systems generating source data objects having different data formats, to a generic source order object being a generic data structure, based on a canonical data model, for internal processing by distributed order orchestration software thereby making the distributed order orchestration software agnostic to the different data formats of the source data objects and converting, in accordance with business rules, the functional attributes of one or more products included in the generic source order object into a plurality of purchase orders, where the business rules are applied to generate a first purchase order for a product and a second purchase order to a supply-side partner for a second product, specified by the business rules, necessary for fulfillment of captured sales order, each of which is in a purchase order format;

utilizing, by the computer, an orchestration layer to provide external task functionality to support creation, update, release and monitoring of external tasks carried out by fulfillment systems;

utilizing, by the computer, a task functional layer to generate and send an internally formatted goods and/or services message including specific business logic wrapped around a selected request to associate specific logical tasks with the selected request and metadata; and utilizing, by the computer, an external interface functional layer configured to receive, analyze, and translate a first request included in a first internally formatted goods and/or services message received from the task functional layer into a first external message having a first external format utilized by a first external fulfillment system of a plurality of external fulfillment systems to provide flexible routing to route the first request to the first external fulfillment system, where metadata is used to route the first external message and to determine the first external format, wherein the first external format includes one or more common signatures used to invoke one or more services provide by the external fulfillment system, wherein the one or more common signatures define a data structure for reuse of the one or more services in a plurality of different business processes, and wherein the one or more services include configurable services and non-configurable services which include different input arguments formulated for different services used in different executable processes, wherein the input arguments are formatted such that a service can read different sets of data and invoke the one or more services.

10. The computer method of claim 9 further comprising:
utilizing the external interface functional layer to translate a second request included in a second internally formatted goods and/or services message received from the task functional layer into an second external message having a second external format utilized by a second external fulfillment system of the plurality of external fulfillment systems to provide flexible routing to route the second request to the second external fulfillment system, where metadata is used to route the second external message and to determine the second external format.

11. The computer method of claim 10 wherein utilizing the external interface functional layer to translate further includes translating an internally formatted message messages using metadata associated with a purchase order.

12. The computer method of claim 9 further comprising rendering upon a display an interface configured to provide a visually perceivable representation of activities undertaken to fulfill a received source order object.

13. The computer method of claim 12 wherein rendering further includes providing a visually perceivable representation of a sequence of tasks.

14. A non-transitory computer-readable storage medium storing distributed order orchestration encoded logic for execution by one or more computer processors, the logic when executed is operable to:

receive process definitions, process configuration information and metadata from a web-based administration environment, with processes defined in business terms and configured to be executed at runtime as executable processes, with process configuration information including a sequence of services on a data table and where defined processes are executable and reusable;

utilize a task functional layer configured to receive, analyze, and provide encapsulated services used to control processing logic for orchestration software functional layers by wrapping specific business logic around a selected request to associate specific logical tasks with the selected request;

utilize a decomposition functional layer configured to capture a sales order, analyze parameters of the sales to determine which orchestration process to apply to the sales order with respect to a customer associated with the sales order and use transformation processes to transform the captured sales order, in a form of a source data object, received from one of a plurality of order capture systems, with the plurality of order capture systems generating source data objects having different data formats, to a generic source order object being a generic data structure, based on a canonical data model, for internal processing by distributed order orchestration software thereby making the distributed order orchestration software agnostic to the different data formats of the source data objects and convert, in accordance with business rules, the functional attributes of one or more products included in the generic source order object into a plurality of purchase orders, where the business rules are applied to generate a first purchase order for a product and a second purchase order to a supply-side partner for a second product, specified by the business rules, necessary for fulfillment of captured sales order, each of which is in a purchase order format;

utilize an orchestration layer to provide external task functionality to support creation, update, release and monitoring of external tasks carried out by fulfillment systems;

utilize a task functional layer to generate and send an internally formatted goods and/or services message including specific business logic wrapped around a selected request to associate specific logical tasks with the selected request and metadata; and utilize an external interface functional layer configured to receive, analyze, and translate a first request included in a first internally formatted goods and/or services message received from the task functional layer into a first external message having a first external format utilized by a first external fulfillment system of a plurality of external fulfillment systems to provide flexible routing to route the first request to the first external fulfillment system, where metadata is used to route the first external message and to determine the first external format, wherein the first external format includes one or more common signatures used to invoke one or more services provide by the external fulfillment system, wherein the one or more common signatures define a data structure for reuse of the one or more services in a plurality of different business processes, and wherein the one or more services include configurable services and non-configurable services which include different input arguments formulated for different services used in different executable processes, wherein the input arguments are formatted such that a service can read different sets of data and invoke the one or more services.

\* \* \* \* \*

UNITED STATES PATENT AND TRADEMARK OFFICE
CERTIFICATE OF CORRECTION

PATENT NO. : 10,025,622 B2
APPLICATION NO. : 12/617698
DATED : July 17, 2018
INVENTOR(S) : Rijhsinghani et al.

Page 1 of 1

It is certified that error appears in the above-identified patent and that said Letters Patent is hereby corrected as shown below:

In the Specification

In Column 2, Line 35, after "order" insert -- . --.

In the Claims

In Column 12, Lines 12-13, Claim 3, delete "message messages" and insert -- message --, therefor.

In Column 13, Lines 66-67, Claim 11, delete "message messages" and insert -- message --, therefor.

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*